(12) United States Patent
Sasaki et al.

(10) Patent No.: US 8,480,990 B2
(45) Date of Patent: Jul. 9, 2013

(54) SILICA POWDER, PROCESS FOR ITS PRODUCTION, AND COMPOSITION EMPLOYING IT

(75) Inventors: Syuji Sasaki, Omuta (JP); Hidetoshi Naito, Omuta (JP); Keishi Iizuka, Omuta (JP); Yasuhisa Nishi, Omuta (JP)

(73) Assignee: Denki Kagaki Kogyo Kabushiki Kaisha, Tokyo (JP)

( * ) Notice: Subject to any disclaimer, the term of this patent is extended or adjusted under 35 U.S.C. 154(b) by 571 days.

(21) Appl. No.: 12/671,375

(22) PCT Filed: Jul. 25, 2008

(86) PCT No.: PCT/JP2008/063409
§ 371 (c)(1),
(2), (4) Date: Jan. 29, 2010

(87) PCT Pub. No.: WO2009/017058
PCT Pub. Date: Feb. 5, 2009

(65) Prior Publication Data
US 2010/0204383 A1 Aug. 12, 2010

(30) Foreign Application Priority Data
Aug. 1, 2007 (JP) ................................. 2007-200701

(51) Int. Cl.
*C01B 33/12* (2006.01)
*B32B 21/02* (2006.01)
*C08K 3/34* (2006.01)

(52) U.S. Cl.
USPC ............................ 423/335; 428/402; 524/493

(58) Field of Classification Search
USPC ............ 523/400; 423/335; 428/402; 524/493
See application file for complete search history.

(56) References Cited

U.S. PATENT DOCUMENTS

2006/0137575 A1 * 6/2006 Stenzel et al. ................ 106/482

FOREIGN PATENT DOCUMENTS

| JP | 60-255602 | | 12/1985 |
|----|-----------|---|---------|
| JP | 03259961 | A * | 11/1991 |
| JP | 5-239321 | | 9/1993 |
| JP | 11-124504 | | 5/1999 |
| JP | 2001-335313 | | 12/2001 |
| JP | 2002-003213 | | 1/2002 |
| JP | 2002-179409 | | 6/2002 |
| JP | 2002-362910 | | 12/2002 |
| JP | 2003-110065 | | 4/2003 |
| JP | 2004-123849 | | 4/2004 |

OTHER PUBLICATIONS

Shimada et al., JP 03-259961 A Derwent Abstract, 1999.*
Office Action as received in the corresponding Japanese Patent Application No. 2009-525372 dated Apr. 9, 2013 w/English Translation.

* cited by examiner

*Primary Examiner* — Peter F Godenschwager
*Assistant Examiner* — David Karst
(74) *Attorney, Agent, or Firm* — Oblon, Spivak, McClelland, Maier & Neustadt, L.L.P.

(57) ABSTRACT

A silica powder containing an ultrafine powder in an amount of from 0.1 to 20 mass % and having an average sphericity of at least 0.85, wherein the ultrafine powder has, as the particle size measured by a dynamic light scattering particle size distribution measuring apparatus, an average particle size of from 150 to 250 nm, less than 10 mass % of the ultrafine powder having a particle size of at most 100 nm being less than 10 mass % (not including 0 mass %) and from 10 to 50 mass % of the ultrafine powder having a particle size exceeding 100 nm and not exceeding 150 nm.

7 Claims, No Drawings

SILICA POWDER, PROCESS FOR ITS PRODUCTION, AND COMPOSITION EMPLOYING IT

CROSS-REFERENCE TO RELATED APPLICATIONS

This application is a National Stage of PCT/JP08/063409 filed Jul. 25, 2008 and claims the benefit of JP 2007-200701 filed Aug. 1, 2007.

TECHNICAL FIELD

The present invention relates to a silica powder, a process for its production, and a composition employing it.

BACKGROUND ART

In recent years, to meet requirements for downsizing, weight saving and high performance of electronic equipments, downsizing, reduction in thickness and reduction in pitch of semiconductor packages are rapidly in progress. Further, the mounting method tends to be mainly surface mounting whereby high density mounting is easy. Under such circumstances, high performance is required also for a sealing material for semiconductors (hereinafter referred to as a "sealing material"), and it is required to further improve the soldering heat resistance, moisture resistance, low thermal expansion and electrical insulating properties. In order to satisfy such requirements, methods have been proposed such that the variation coefficient of the particle size distribution of a silica powder is made to be at most 10% to make the particle size distribution sharp (Patent Document 1), the sphericity of particles having a particle size of at least 45 μm is made to be from 0.75 to 1.0 thereby to increase the sphericity in the coarse powder region (Patent Document 2), and a spherical fine silica powder having an average particle size of from about 0.1 to 1 μm is added in a small amount (Patent Document 3), and it has been attempted to improve the flowability and packing properties of the sealing material. However, such properties have been improved so much that there has been a problem of formation of a flash, such that a sealing material is likely to flow out from an air bent portion of a mold during molding.

Patent Document 1: JP-A-11-124504
Patent Document 2: JP-A-2004-123849
Patent Document 3: JP-A-5-239321

DISCLOSURE OF THE INVENTION

Object to be Accomplished by the Invention

It is an object of the present invention to provide a silica powder which is excellent in flowability and packing properties and less likely to form a flash and which is suitable for the production of a sealing material, a process for its production, and a composition of a rubber and/or a resin employing it, particularly a sealing material for semiconductors.

Means to Accomplish the Object

The present invention provides a silica powder containing an ultrafine powder in an amount of from 0.1 to 20 mass % and having an average sphericity of at least 0.85, wherein the ultrafine powder has, as the particle size measured by a dynamic light scattering particle size distribution measuring apparatus, an average particle size of from 150 to 250 nm, a content of particles having a particle size of at most 100 nm being less than 10 mass % (not including 0 mass %) and a content of particles having a particle size exceeding 100 nm and not exceeding 150 nm being from 10 to 50 mass %.

In the present invention, the particle size constitution of the silica powder is preferably such that it has an average particle size of from 5 to 50 μm as measured by a laser diffraction scattering particle size distribution measuring apparatus and has a multi-peak particle size distribution with at least two peaks, wherein the maximum value of a first peak is within a range of from 3 to 15 μm, and the maximum value of a second peak is within a range of from 20 to 80 μm.

Further, the present invention provides a process for producing a silica powder, which comprises spraying a silica powder material to a high temperature zone of at least 1,750° C. formed by a burner for heat treatment, wherein the high temperature zone is formed in a range of from the forward end of the burner to 3.0-4.5 m therefrom, and to such a high temperature zone, a silica powder material containing from 0.05 to 10 mass % of a metal silicon powder is sprayed.

The silica powder material to be used in the present invention, is preferably a pulverized product of natural silica stone containing from 0.05 to 10 mass % of a metal silicon powder.

Further, the present invention provides a composition having the silica powder of the present invention incorporated in an amount of from 10 to 99 mass % in at least one of a rubber and a resin.

Further, the present invention provides a sealing material made of the composition of the present invention wherein the resin is an epoxy resin.

Effects of the Invention

According to the present invention, it is possible to obtain a silica powder which is excellent in flowability and packing properties and which is less likely to form a flash, and to provide a composition having such a silica powder incorporated in at least one of a rubber and a resin, particularly a sealing material.

BEST MODE FOR CARRYING OUT THE INVENTION

The silica powder of the present invention contains an ultrafine powder in an amount of from 0.1 to 20 mass %. The ultrafine powder in the silica powder of the present invention is defined to be such that the particle size is less than 0.45 μm; as the particle size measured by a dynamic light scattering particle size distribution measuring apparatus, the average particle size is from 150 to 250 nm, and the content of particles having a particle size of at most 100 nm is less than 10 mass % (not including 0 mass %) and the content of particles having a particle size exceeding 100 nm and not exceeding 150 nm is from 10 to 50 mass %; and it is made of silica. If the content of such an ultrafine powder is less than 0.1 mass %, the effect to reduce a flash tends to be hardly obtainable. On the other hand, if it exceeds 20 mass %, when such a silica powder is highly packed to e.g. a resin, the viscosity increases to deteriorate the flowability and packing properties. Particularly preferably, the content of the ultrafine powder is from 1 to 15 mass %.

If the average particle size of the ultrafine powder is less than 150 nm, the melt viscosity increases thereby to deteriorate the flowability and packing properties, although the effect to reduce a flash may be obtained. On the other hand, if the average particle size exceeds 250 nm, the effect to reduce a flash decreases although the flowability and packing properties may be improved. A preferred average particle size of the ultrafine powder is from 170 to 210 nm. Further, if the content of particles having a particle size of at most 100 nm and the content of particles having a particle size exceeding 100 nm and not exceeding 150 nm, in the ultrafine powder, are outside the above-mentioned ranges, particles not contributing to a high density packing structure of the silica powder tend to be many, whereby when it is highly packed to e.g. a resin, the viscosity tends to increase thereby to deteriorate the flowability and packing properties. A preferred content of particles having a particle size of at most 100 nm is from 2 to 9 mass %, and a preferred content of particles having a particle size exceeding 100 nm and not exceeding 150 nm is from 15 to 40 mass %.

The particle size constitution of the ultrafine powder is automatically measured by a dynamic light scattering particle size distribution measuring apparatus ("Nanotorac 150" manufactured by NIKKISO CO., LTD.). As a sample, a blend of 3 g of a silica powder and 27 g of water was stirred for 3 minutes by an ultrasonic homogenizer at an output of 200 W to prepare a slurry having a silica concentration of 10 mass %, and the slurry was subjected to centrifugal separation for 13 minutes at 1,000 G to have coarse particles sedimented, and 20 ml of the supernatant was used. The analysis of the particle size distribution was carried out by dividing the particle size range of from 0.003 to 6.5 µm into 43 sections. As the refractive index of water, 1.33 was used, and as the refractive index of the silica powder, 1.46 was used.

The average sphericity of the silica powder of the present invention is at least 0.85. The higher the sphericity of the silica powder, the lower the rolling resistance in the sealing material, whereby the flowability will be improved. Accordingly, the average sphericity is particularly preferably at least 0.90.

The average sphericity is measured as follows. A particle image photographed by e.g. a stereomicroscope (e.g. "Model SMZ-10", tradename, manufactured by Nikon) is taken into an image analyzer (e.g. "MacView, tradename, manufactured by Mountech Co., Ltd.), and from the photograph, the projected area (A) and peripheral length (PM) of a particle are measured. When the area of a perfect circle corresponding to the peripheral length (PM) is represented by (B), the sphericity of the particle becomes A/B. Accordingly, when a perfect circle having the same peripheral length as the peripheral length (PM) of the sample is assumed, PM=$2\pi r$, and B=$\pi r^2$, and accordingly, B=$\pi \times (PM/2\pi)^2$, and the sphericity of an independent particle will be represented by sphericity=A/B=A$\times 4\pi/(PM)^2$. Sphericities of optional 200 particles are thus obtained, and the average value thereof is taken as an average sphericity.

The silica powder of the present invention has an average particle size of from 5 to 50 µm, preferably from 8 to 40 µm, and is preferably one having a multi-peak frequency particle size distribution with at least two peaks. That is, as the particle size measured by a laser diffraction scattering particle size distribution measuring apparatus ("Model LS-230" manufactured by Beckman Coulter), it preferably has a multi-peak frequency particle size distribution with at least two peaks, wherein the maximum value of a first peak is within a range of from 3 to 15 µm, preferably from 4 to 13 µm, and the maximum value of a second peak is within a range of from 20 to 80 µm, preferably from 25 to 65 µm. It is thereby possible that formation of a highly dense packing structure of the silica powder is facilitated and it becomes possible to highly pack the silica powder to e.g. a resin.

In the preparation of a sample for the laser diffraction scattering particle size distribution measurement, water was used as the medium, and the PIDS (Polarization Intensity Differential Scattering) concentration was adjusted to from 45 to 55 mass %, and stirring was carried out for 1 minute by an ultrasonic homogenizer at an output of 200 W. The analysis of the particle size distribution was carried out by dividing the range of from 0.04 to 2,000 µm by 116 sections with a width of a particle size channel being log (µm)=0.04. As the refractive index of water, 1.33 was employed, and as the refractive index of the silica powder, 1.46 was employed.

The silica powder of the present invention is preferably an amorphous silica powder obtained by melting crystalline silica at a high temperature. It is thereby possible that the difference in thermal expansion coefficient between the semiconductor chip and the sealing material becomes small, and there is a merit such that the soldering heat resistance and moisture resistance will be further increased, and the mold abrasion tends to small. For the amorphous ratio, using a powder X-ray diffraction apparatus, such as "Model Mini Flex" (manufactured by Rigaku Corporation), the X-ray diffraction analysis is carried out within such a range that 2θ of CuKα-ray is from 26° to 27.5°, and the amorphous ratio is obtained from the intensity ratio of the specific diffraction peaks. That is, crystalline silica has a main peak at 26.7°, but amorphous silica does not have such a peak. When amorphous silica and crystalline silica are present as mixed, the height of the peak at 26.7° corresponding to the proportion of the crystalline silica is obtainable. Accordingly, from the ratio of the X-ray intensity of the sample to the X-ray intensity of a standard sample of crystalline silica, the crystalline silica mixed ratio (=X-ray diffraction intensity of the sample/X-ray diffraction intensity of crystalline silica) is calculated, and the amorphous ratio is obtained by the formula of amorphous ratio (%)=(1−crystalline silica mixed ratio)×100.

The silica powder of the present invention can be produced by the process of the present invention. At that time, the average sphericity of the silica powder can be increased or decreased by the amount of spraying the silica powder material and the temperature in the furnace. Further, the average particle size of the silica powder can be increased or decreased by the average particle size of the silica powder material. The method for increasing or decreasing the multi-peak distribution and the content of the ultrafine powder in the silica powder, will be described hereinafter.

The process of the present invention is a process for melting and spheroidizing a silica powder material by spraying the material to a high temperature zone where the temperature in the furnace is at least 1,750° C., preferably at least 1,780° C., wherein it is essential that by spraying flammable gas and oxygen gas from a burner, the high temperature zone where the temperature in the furnace is at least 1,750° C., is formed in a range of from the forward end of the burner to a position of 3.0-4.5 m, preferably 3.5-4.5 m, therefrom, and to such a high temperature zone, a silica powder material containing from 0.05 to 10 mass % of a metal silicon powder is sprayed.

The metal silicon powder to be used in the present invention preferably has a Si purity of at least 99.0 mass %, more preferably at least 99.5 mass %.

Further, the material other than the metal silicon powder in the silica powder material to be used in the present invention may, for example, be a powder of naturally-produced silica-containing minerals such as natural silica stone, high purity silica sand, quartz, rock crystal, etc., or a high purity silica powder produced by a synthetic method such as precipitated silica or silica gel. Among them, a pulverized product of natural silica stone is most preferred in consideration of costs and availability. With respect to the pulverized product of natural silica stone, ones pulverized by a pulverizer such as a vibration mill or a ball mill to have various average particle sizes, are commercially available, and a pulverized product of natural silica stone having a desired average particle size may be suitably selected for use.

The present invention is characterized in that while in the prior art, the high temperature zone where the temperature in the furnace is at least 1,750° C., was in a range of from the forward end of the burner to about 1.0-2.5 m therefrom, such a high temperature zone is elongated to be a range from the forward end of the burner to 3.0-4.5 m therefrom. If the high temperature zone where the temperature in the furnace is at least 1,750° C., is formed only in a range of from the forward end of the burner to less than 3 m therefrom, the particle growth of the ultrafine powder tends to be inadequate, and formation of the ultrafine powder tends to be difficult. Besides, the average sphericity of the silica powder tends to be less than 0.85. On the other hand, if the high temperature zone where the temperature in the furnace is at least 1,750° C., is formed beyond 4.5 m from the forward end of the burner, the formed ultrafine powder tends to undergo grain growth too much, whereby formation of the ultrafine powder tends to be difficult again. The temperature in the furnace was measured at a position of 5 cm from the inner wall of the furnace by a B thermocouple (Model No.; HD2128.2, compensating lead wire: Cu, manufactured by Sakaki Corporation) employing an alumina protective tube (thickness: 3 mm).

In order to elongate the region for forming the high temperature zone where the temperature in the furnace is at least 1,750° C., like in the present invention, such an operation is carried out by suitably controlling the conditions such that the spraying amount of a flammable gas is increased, the amount of external air flowing into the furnace is reduced, the diameter of the furnace body is reduced, or the spraying amount of the silica powder material is reduced. For example, it is carried out by selecting the spraying amount of a flammable gas within a range of from 60 to 100 $Nm^3$/hr, the spraying amount of oxygen gas within a range of from 300 to 500 $Nm^3$/hr, the amount of external air flowing in within a range of from 50 to 100 $Nm^3$/hr and the spraying amount of the silica powder material within a range of from 100 to 250 kg/hr.

In the present invention, if the content of the metal silicon powder in the silica powder material is less than 0.05 mass %, the gas phase component (the SiO-containing gas) formed by evaporation of metal silicon tends to be small, whereby the content of the ultrafine powder in the silica powder will be less than 0.1 mass %. On the other hand, if the content of the metal silicon powder in the silica powder material exceeds 10 mass %, formation of the SiO-containing gas increases, whereby the content of the ultrafine powder in the silica powder will exceed 20 mass %. In each case, it is not possible to produce the silica powder of the present invention. A particularly preferred content of the metal silicon powder in the silica powder material is from 0.5 to 7.5 mass %.

Components other than the silica powder and the metal silicon powder in the silica powder material are, for example, $Al_2O_3$, $Fe_2O_3$, CaO, etc., and their content is preferably at most 0.5 mass %, more preferably at most 0.3 mass %, in total.

Rather than mechanically mixing a silica powder and an ultrafine powder to produce a silica powder containing the ultrafine powder in an amount of from 0.1 to 20 mass %, it is preferred to mix an ultrafine powder to the silica powder while forming the ultrafine powder at a high temperature zone as in the present invention, whereby agglomeration of the ultrafine powder can be prevented, and the ultrafine powder can be monodispersed in the silica powder. The content of the ultrafine powder in the silica powder can be increased or decreased by the content of the metal silicon powder in the silica powder material.

The content of the ultrafine powder in the silica powder is determined in such a manner that a blend of ethanol and the silica powder is subjected to an ultrasonic homogenizer at an output of 200 W for 3 minutes to prepare a silica slurry having 10 mass % of the silica powder, which is permitted to naturally flow down through a membrane filter with an aperture of 0.45 μm, whereby the amount of a powder passing through the membrane filter is measured and represented by a percentage in the silica powder (content (%) of the ultrafine powder in silica=(the amount of silica powder passed through the filter/the amount of silica powder supplied to the measurement)×100).

A silica powder having a multi-peak particle size distribution with two peaks wherein the maximum value of the first peak is within a range of from 3 to 15 μm, and the maximum value of the second peak is within a range of from 20 to 80 μm can be produced by preliminarily preparing silica powders having particle sizes within the respective ranges each containing an ultrafine powder in an amount of from 0.1 to 20 mass %, in accordance with the above-described method, and mixing them in suitable amounts.

Now, the composition of the present invention will be described. The composition of the present invention is one having the silica powder of the present invention incorporated in an amount of from 10 to 99 mass % in at least one of a rubber and a resin. Particularly, a composition wherein the resin is an epoxy resin is suitable as a sealing material.

The rubber to be used in the composition may, for example, be silicon rubber, urethane rubber, acryl rubber, butyl rubber, ethylene-propylene rubber or ethylene/vinyl acetate copolymer.

Whereas, the resin to be used in the composition may, for example, be an epoxy resin, a silicone resin, a phenol resin, a melamine resin, a urea resin, an unsaturated polyester, a fluororesin, a polyamide such as polyimide, polyamideimide or polyetherimide, a polyester such as polybutylene terephthalate or polyethylene terephthalate, a polyphenylene sulfide, a wholly aromatic polyester, a polysulfone, a liquid crystal polymer, a polyether sulfone, a polycarbonate, a maleimide-modified resin, an ABS resin, an AAS (acrylonitrile/acryl rubber/styrene) resin or an AES (acrylonitrile/ethylene/propylene/diene rubber/styrene) resin.

As a resin for a sealing material, an epoxy resin having at least two epoxy groups in one molecule is preferred. It may, for example, be a phenol novolac epoxy resin; an orthocresol novolac epoxy resin; one obtained by epoxidizing a novolac resin of a phenol with an aldehyde; a glycidyl ester epoxy resin obtained by a reaction of epochlorohydrin with a polybasic acid such as phthalic acid or dimer acid and a glycidyl ether of e.g. bisphenol A, bisphenol F or bisphenol S; a linear aliphatic epoxy resin; an alicyclic epoxy resin; a heterocyclic epoxy resin; an alkyl-modified polyfunctional epoxy resin; a β-naphthol novolac epoxy resin; a 1,6-dihydroxynaphthalene epoxy resin; a 2,7-dihydroxynaphthalene epoxy resin; a bishydroxybiphenyl epoxy resin; or an epoxy resin having a halogen such as bromine introduced in order to impart flame retardancy. Among them, from the viewpoint of the moisture resistance or solder reflow resistance, an orthocresol novolac epoxy resin, a bishydroxybiphenyl epoxy resin or a naphthalene-backbone epoxy resin may, for example, be most preferred.

The curing agent for the epoxy resin is not particularly limited so long as it is capable of reacting and curing the epoxy resin. It may, for example, be a novolac resin obtained by reacting at least one member selected from the group consisting of phenol, cresol, xylenol, resorcinol, chlorophenol, t-butylphenol, nonylphenol, isopropylphenol and octylphenol, with formaldehyde, paraformaldehyde or paraxylene in the presence of an oxidizing catalyst; a polyparahydroxystyrene resin; a bisphenol compound such as bisphenol A or bisphenol S; a tri-functional phenol such as pyrogallol or phloroglucinol; an acid anhydride such as maleic anhydride, phthalic anhydride or pyromellitic anhydride; or an aromatic amine such as methaphenylenediamine, diaminodiphenylmethane or diaminodiphenylsulfone.

To the composition of the present invention, the following components may be incorporated, as the case requires.

That is, a stress-lowering agent may, for example, be a rubbery material such as silicone rubber, polysulfide rubber, acrylic rubber, butadiene rubber, a styrene block copolymer or a saturated elastomer; a resinous material such as various thermoplastic resins or a silicone resin; or a resin having a part or whole of an epoxy resin or a phenol resin modified with aminosilicone, epoxysilicone, an alkoxysilicone or the like.

A silane coupling agent may, for example, be an epoxysilane such as γ-glycidoxypropyl trimethoxysilane or β-(3,4-epoxycyclohexyl)ethyl trimethoxysilane; an aminosilane such as aminopropyl triethoxysilane, ureidopropyl triethoxysilane or N-phenylaminopropyl trimethoxysilane; a hydrophobic silane compound such as phenyl trimethoxysilane, methyl trimethoxysilane or octadecyl trimethoxysilane; or mercaptosilane.

A surface-treating agent may, for example, be a Zr chelate, a titanate coupling agent or an aluminum coupling agent.

A flame retardancy assisting agent may, for example, be $Sb_2O_3$, $Sb_2O_4$ or $Sb_2O_5$, and a flame retardant may, for example, be a halogenated epoxy resin or a phosphorus compound. A coloring agent may, for example, be carbon black, iron oxide, a dye or a pigment.

Further, a release agent such as wax may be incorporated. Its specific examples include natural waxes, synthetic waxes, metal salts of linear aliphatic acids, acid amides, esters, paraffins, etc.

Especially when a high moisture resistance reliability or a high temperature stability is required, it is effective to incorporate an ion trapping agent. Specific examples of such an ion trapping agent include "DHF-4A", "KW-2000" and "KW-2100", tradenames, manufactured by Kyowa Chemical Industry Co., Ltd. and "IXE-600", tradename, manufactured by Toagosei Co., Ltd.

To the composition of the present invention, it is possible to incorporate a curing accelerator to accelerate the reaction of the epoxy resin with the curing agent. The curing accelerator may, for example, be 1,8-diazabicyclo(5,4,0)undecene-7, triphenylphosphine, benzyldimethylamine or 2-methylimidazole.

The composition of the present invention can be produced by blending the predetermined amounts of the above-described various materials by e.g. a blender or a Henschel mixer, then kneading the blend by e.g. hot rolls, a kneader or a single screw or twin screw extruder, followed by cooling and pulverization.

The sealing material of the present invention is made of the composition of the present invention, wherein the resin is an epoxy resin.

For a method of sealing a semiconductor by means of the composition of the present invention, a molding method by e.g. a transfer mold or a multiplunger may be employed.

EXAMPLES

Now, the present invention will be described in further detail with reference to Examples and Comparative Examples. However, it should be understood that the present invention is by no means restricted to the following Examples.

Examples 1 to 14 and Comparative Examples 1 to 8

Using an apparatus as illustrated in JP-A-11-71107, spheroidizing treatment was carried out. That is, a burner was set at an upper portion of a furnace body having a furnace body diameter of 2 m, and by spraying from 60 to 100 $Nm^3$/hr of LPG and from 300 to 500 $Nm^3$/hr of oxygen gas, a high temperature zone where the temperature in the furnace was at least 1,750° C., was formed. On the other hand, from 100 to 250 kg/hr of a pulverized product of natural silica stone ($SiO_2$ purity: 99.9 mass %, average particle size: 3 to 60 μm) containing from 0 to 12 mass % of a metal silicon powder (Si purity: 99.9 mass %, average particle size: 5 μm), as the silica powder material, was sprayed from the center portion of the burner to the high temperature zone to carry out spheroidizing treatment. Further, from 50 to 100 $Nm^3$/hr of air was permitted to flow in from an external air inlet provided at an upper portion of the furnace body. The formed silica powder was suction-transported together with a combustion exhaust gas by a blower and collected from a cyclone.

By variously changing the spray amounts of LPG, oxygen gas and the silica powder material, and the external air inflow rate, within the above ranges, the range for forming the high temperature zone where the temperature in the furnace is at least 1,750° C., was changed to a range of from the forward end of the burner to 2.5-5.0 m therefrom. Such conditions, the content of the metal silicon powder in the silica powder material and the characteristics of the silica powder (silica powder intermediate a-n) collected from the cyclone, are shown in Table 1. Further, adjustment of the maximum value of the silica powder intermediate was carried out by adjustment of the average particle size of the pulverized product of natural silica stone and the multistage sieving operation.

The silica powder intermediates a to n were blended in various proportions as shown in Tables 2 and 3 to produce silica powders A to V, and their properties were evaluated. The results are shown in Table 2 (Examples) and Table 3 (Comparative Examples). Each of the amorphous ratios of the silica powders A to V was at least 99%.

Then, in order to evaluate properties of the silica powders A to V as a sealing material based on mass %, to 89% of one of the silica powders A to V, 4.6% of a 4,4'-bis(2,3-epoxypropoxy)-3,3',5,5'-tetramethylbiphenyl type epoxy resin, 4.7% of a phenol resin, 0.2% of triphenylphosphine, 0.6% of γ-glycidoxypropyl trimethoxysilane, 0.3% of carbon black and 0.6% of carnauba wax were added (total 100%), followed by dry blending by a Henschel mixer. Then, the obtained blended product was heat-kneaded by a parallel matching twin screw extruder (screw diameter D: 25 mm, kneading disk length: 10 Dmm, paddle rotational speed: 120 to 160 rpm, discharge amount: 4 kg/hr, heater temperature: 95 to 100° C.). The discharged product was cooled by a cooling pressing machine and then pulverized to obtain a sealing material, whereupon the flowability, packing properties and the flash length were evaluated by the following methods. The results are shown in Tables 2 and 3.

(1) Flowability (Spiral Flow)

Using a transfer molding machine provided with a mold for measuring a spiral flow in accordance with EMMI-I-66 (Epoxy Molding Material Institute; Society of Plastic Industry), the spiral flow value was measured. The transfer molding conditions were such that the mold temperature was 175° C., the molding pressure was 7.4 MPa, and the pressure-holding time was 90 seconds.

The larger the spiral flow value, the better the flowability.

(2) Packing Properties (Number of Voids)

24 Semiconductor packages of 160 pin QFP (Quad Flat Package; 28 mm×28 mm, thickness: 3.6 mm, simulated IC chip size: 15 mm×15 mm) were prepared by using a transfer molding machine, and the number of voids of at least 0.1 mm remaining in the package was counted by an ultrasonic flaw detector, and the number of voids per one package was calculated. The transfer molding conditions were such that the mold temperature was 175° C., the molding pressure was 7.4 MPa, the pressure-holding time was 90 seconds, and the preheat temperature of the sealing material was 80° C.

(3) Flash Length

48 Semiconductor packages of 32 pin LOC (Lead on Chip) structure TSOP (Thin Small Outline Package; 10 mm×21 mm, thickness: 1.0 mm, simulated IC chip size 9 mm×18 mm, lead frame made of 42 alloy) were prepared by a transfer molding machine, and their flash lengths were measured and averaged. The transfer molding conditions were such that the molding temperature was 175° C., the molding pressure was 7.4 MPa, and the pressure-holding time was 90 seconds.

TABLE 1

| Name of silica powder intermediate | | a | b | c | d | e | f | g | h |
|---|---|---|---|---|---|---|---|---|---|
| LPG spray amount (Nm$^3$/hr) | | 80 | 90 | 80 | 80 | 60 | 100 | 90 | 80 |
| Oxygen gas spray amount (Nm$^3$/hr) | | 400 | 450 | 400 | 400 | 300 | 500 | 450 | 400 |
| Air inflow rate (Nm$^3$/hr) | | 70 | 60 | 70 | 60 | 100 | 50 | 50 | 70 |
| Spray amount of silica powder material (kg/hr) | | 220 | 200 | 150 | 200 | 250 | 150 | 170 | 240 |
| Content of metal silicon powder in silica powder material (mass %) | | 4.5 | 7.0 | 3.5 | 1.0 | 3.5 | 3.5 | 0.0 | 0.0 |
| Distance (m) from the forward end of the burner of the high temperature zone of at least 1,750° C. | | 4.0 | 4.0 | 4.0 | 4.0 | 2.5 | 5.0 | 4.5 | 3.5 |
| Ultrafine powder | Average particle size (nm) | 188 | 218 | 177 | 185 | 123 | 270 | 234 | 182 |
| | Proportion (mass %) of particles of at most 100 nm | 6.8 | 2.3 | 8.5 | 8.0 | 18.9 | 1.7 | 7.0 | 8.6 |
| | Proportion (mass %) of particles exceeding 100 nm and not exceeding 150 nm | 30.1 | 23.5 | 31.1 | 34.1 | 58.8 | 15.5 | 26.6 | 31.8 |
| Content (mass %) of ultrafine powder in silica powder intermediate | | 9.1 | 14.8 | 7.9 | 2.2 | 7.5 | 7.4 | 0.08 | 0.07 |
| Average sphericity of silica powder intermediate (—) | | 0.87 | 0.89 | 0.91 | 0.88 | 0.82 | 0.91 | 0.90 | 0.85 |
| Maximum value (μm) of silica powder intermediate | | 5.5 | 13.3 | 47.0 | 62.8 | 47.3 | 46.9 | 5.3 | 46.2 |

| Name of silica powder intermediate | | i | j | k | l | m | n |
|---|---|---|---|---|---|---|---|
| LPG spray amount (Nm$^3$/hr) | | 80 | 80 | 70 | 80 | 90 | 70 |
| Oxygen gas spray amount (Nm$^3$/hr) | | 400 | 400 | 350 | 400 | 450 | 350 |
| Air inflow rate (Nm$^3$/hr) | | 70 | 60 | 80 | 70 | 70 | 70 |
| Spray amount of silica powder material (kg/hr) | | 170 | 200 | 230 | 200 | 100 | 230 |
| Content of metal silicon powder in silica powder material (mass %) | | 12.0 | 12.0 | 3.5 | 4.0 | 4.0 | 4.0 |
| Distance (m) from the forward end of the burner of the high temperature zone of at least 1,750° C. | | 4.0 | 4.0 | 2.5 | 4.0 | 4.5 | 4.0 |
| Ultrafine powder | Average particle size (nm) | 179 | 184 | 151 | 185 | 213 | 181 |
| | Proportion (mass %) of particles of at most 100 nm | 8.5 | 8.4 | 9.4 | 8.2 | 7.1 | 8.8 |
| | Proportion (mass %) of particles exceeding 100 nm and not exceeding 150 nm | 31.5 | 35.4 | 45.2 | 32.1 | 27.5 | 35.5 |
| Content (mass %) of ultrafine powder in silica powder intermediate | | 24.4 | 23.5 | 7.8 | 8.1 | 8.8 | 8.8 |
| Average sphericity of silica powder intermediate (—) | | 0.90 | 0.88 | 0.83 | 0.88 | 0.94 | 0.80 |
| Maximum value (μm) of silica powder intermediate | | 5.7 | 45.1 | 5.5 | 2.8 | 15.3 | 85.3 |

TABLE 2

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Name of silica powder | | A | B | C | D | E | F | G | H |
| Ultrafine powder | Average particle size (nm) | 180 | 181 | 185 | 178 | 186 | 245 | 189 | 233 |
| | Proportion (mass %) of particles of at most 100 nm | 8.0 | 7.8 | 7.8 | 8.5 | 7.6 | 3.2 | 6.6 | 4.0 |
| | Proportion (mass %) of particles exceeding 100 nm and not exceeding 150 nm | 30.8 | 30.7 | 33.6 | 31.2 | 32.9 | 19.9 | 28.8 | 22.1 |

TABLE 2-continued

|  |  |  |  |  |  |  |  |  |
|---|---|---|---|---|---|---|---|---|
| Content of ultrafine powder in silica powder (mass %) | | 8.3 | 8.4 | 18.5 | 12.9 | 4.3 | 7.9 | 10.0 | 8.2 |
| Silica powder | Blend ratio (mass %) of silica powder intermediate | a30 c70 | a40 c60 | a35 j65 | c70 i30 | a30 d70 | a30 f70 | b30 c70 | a45 f65 |
| | Maximum particle size (μm) of first peak | 5.5 | 5.5 | 5.5 | 5.7 | 5.5 | 5.5 | 13.3 | 5.5 |
| | Maximum particle size (μm) of second peak | 47.0 | 47.0 | 45.1 | 47.0 | 62.8 | 46.9 | 47.0 | 46.9 |
| | Average sphericity (—) | 0.90 | 0.89 | 0.88 | 0.91 | 0.88 | 0.90 | 0.90 | 0.89 |
| | Average particle size (μm) | 32.7 | 28.5 | 29.9 | 33.2 | 44.2 | 33.3 | 36.1 | 27.1 |
| Spiral flow (cm) | | 129 | 125 | 120 | 130 | 121 | 136 | 125 | 132 |
| Number of voids (number) | | 0 | 1 | 1 | 0 | 1 | 0 | 0 | 1 |
| Flash length (mm) | | 1.9 | 1.5 | 1.1 | 1.7 | 1.9 | 2.9 | 1.8 | 1.9 |

|  |  |  | Ex. 9 | Ex. 10 | Ex. 11 | Ex. 12 | Ex. 13 | Ex. 14 |
|---|---|---|---|---|---|---|---|---|
| Name of silica powder | | | I | J | K | L | M | N |
| Ultrafine powder | Average particle size (nm) | | 186 | 169 | 193 | 180 | 191 | 202 |
| | Proportion (mass %) of particles of at most 100 nm | | 7.5 | 8.8 | 6.6 | 8.4 | 7.9 | 7.0 |
| | Proportion (mass %) of particles exceeding 100 nm and not exceeding 150 nm | | 32.3 | 35.3 | 31.5 | 31.5 | 29.7 | 28.7 |
| Content of ultrafine powder in silica powder (mass %) | | | 5.3 | 7.9 | 5.4 | 8.0 | 8.3 | 8.9 |
| Silica powder | Blend ratio (mass %) of silica powder intermediate | | a45 d55 | c70 k30 | b25 d75 | c60 l40 | c60 m40 | a45 m55 |
| | Maximum particle size (μm) of first peak | | 5.5 | 5.5 | 13.3 | 2.8 | 15.3 | 5.5 |
| | Maximum particle size (μm) of second peak | | 62.8 | 47.0 | 62.8 | 47.0 | 47.0 | 15.3 |
| | Average sphericity (—) | | 0.88 | 0.89 | 0.88 | 0.90 | 0.92 | 0.91 |
| | Average particle size (μm) | | 35.6 | 33.2 | 50.2 | 28.1 | 33.0 | 10.1 |
| Spiral flow (cm) | | | 123 | 121 | 119 | 120 | 121 | 120 |
| Number of voids (number) | | | 1 | 1 | 2 | 2 | 2 | 1 |
| Flash length (mm) | | | 1.0 | 1.1 | 2.5 | 2.1 | 2.2 | 2.8 |

TABLE 3

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Name of silica powder | | O | P | Q | R | S | T | U | V |
| Ultrafine powder | Average particle size (nm) | 145 | 140 | 259 | 198 | 183 | 173 | 134 | 184 |
| | Proportion (mass %) of particles of at most 100 nm | 14.7 | 15.8 | 3.3 | 8.1 | 8.4 | 8.8 | 15.1 | 7.9 |
| | Proportion (mass %) of particles exceeding 100 nm and not exceeding 150 nm | 47.9 | 50.6 | 18.8 | 30.2 | 34.2 | 35.8 | 53.4 | 33.1 |
| Content of ultrafine powder in silica powder (mass %) | | 14.3 | 12.6 | 5.2 | 0.07 | 23.8 | 2.4 | 7.6 | 8.9 |
| Silica powder | Blend ratio (mass %) of silica powder intermediate | e60 i40 | e70 i30 | f70 g30 | g30 h70 | i30 j70 | h70 k30 | e60 k40 | a45 n55 |
| | Maximum particle size (μm) of first peak | 5.7 | 5.7 | 5.3 | 5.3 | 5.7 | 5.5 | 5.5 | 5.5 |

TABLE 3-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
| --- | --- | --- | --- | --- | --- | --- | --- | --- |
| Maximum particle size (μm) of second peak | 47.3 | 47.3 | 46.9 | 46.2 | 45.1 | 46.2 | 47.3 | 85.3 |
| Average sphericity (—) | 0.85 | 0.84 | 0.91 | 0.87 | 0.89 | 0.84 | 0.82 | 0.83 |
| Average particle size (μm) | 28.9 | 33.7 | 33.2 | 32.3 | 31.9 | 32.0 | 29.0 | 48.9 |
| Spiral flow (cm) | 97 | 88 | 127 | 120 | 85 | 104 | 91 | 106 |
| Number of voids (number) | 4 | 5 | 1 | 2 | 8 | 3 | 5 | 9 |
| Flash length (mm) | 2.3 | 2.9 | 9.4 | 10.0 | 2.4 | 2.5 | 2.1 | 2.2 |

It is apparent from comparison between Examples and Comparative Examples that the sealing materials packed with the silica powders of the present invention were excellent in flowability and packing properties and had short flash lengths even when the packing ratio of the silica powders was 89 mass %.

INDUSTRIAL APPLICABILITY

The silica powder of the present invention is useful as a resin-molding material such as a molding compound for e.g. automobiles, portable electronic devices or electrical home appliances, and as a packing material for e.g. putty, sealing material, marine buoyancy material, synthetic wood, reinforced cement external wall material, light weight external wall material or sealant. Further, the composition of the present invention is useful for the production of a prepreg for printed boards, having the composition impregnated and cured in a glass woven fabric, glass non-woven fabric or other organic substrate, an electronic component having one or more prepregs heated and formed together with copper foils, etc., and further a wire-covering material, a sealing material, a varnish, etc. Further, the sealing material of the present invention is useful as a sealing material which can easily be formed into a semiconductor package having a small size, thin thickness and reduced pitch.

The entire disclosure of Japanese Patent Application No. 2007-200701 filed on Aug. 1, 2007 including specification, claims and summary is incorporated herein by reference in its entirety.

The invention claimed is:

1. A silica powder comprising an ultrafine powder in an amount of from 0.1 to 20 mass % and having an average sphericity of at least 0.85, wherein the ultrafine powder has, as the particle size measured by a dynamic light scattering particle size distribution measuring apparatus, an average particle size of from 150 to 250 nm, less than 10 mass % and not including 0 mass % of the ultrafine powder having a particle size of at most 100 nm and from 10 to 50 mass % of the ultrafine powder having a particle size exceeding 100 nm and not exceeding 150 nm.

2. The silica powder according to claim 1, which has an average particle size of from 5 to 50 μm as measured by a laser diffraction scattering particle size distribution measuring apparatus and has a multi-peak particle size distribution with at least two peaks, wherein the maximum value of a first peak is within a range of from 3 to 15 μm, and the maximum value of a second peak is within a range of from 20 to 80 μm.

3. A process for producing the silica powder according to claim 1, which comprises spraying a silica powder material to a high temperature zone of at least 1,750° C. formed by a burner for heat treatment, wherein the high temperature zone is formed in a range of from the forward end of the burner to 3.0-4.5 m therefrom, and to such a high temperature zone, a silica powder material containing from 0.05 to 10 mass % of a metal silicon powder is sprayed.

4. The process according to claim 3, wherein the silica powder material is a pulverized product of natural silica stone containing from 0.05 to 10 mass % of a metal silicon powder.

5. A composition comprising the silica powder according to claim 1 incorporated in an amount of from 10 to 99 mass % in at least one of a rubber and a resin.

6. The composition according to claim 5, wherein the resin is an epoxy resin.

7. A sealing material for semiconductors, comprising the composition as defined in claim 6.

* * * * *

UNITED STATES PATENT AND TRADEMARK OFFICE
CERTIFICATE OF CORRECTION

PATENT NO. : 8,480,990 B2
APPLICATION NO. : 12/671375
DATED : July 9, 2013
INVENTOR(S) : Syuji Sasaki et al.

It is certified that error appears in the above-identified patent and that said Letters Patent is hereby corrected as shown below:

On the title page, Item (73), the Assignee's Information is incorrect. Item (73) should read:

--(73) Assignee: Denki Kagaku Kogyo Kabushiki Kaisha, Tokyo (JP)--

Signed and Sealed this
Twenty-seventh Day of August, 2013

Teresa Stanek Rea
*Acting Director of the United States Patent and Trademark Office*